US011443006B2

(12) United States Patent
Shetty et al.

(10) Patent No.: US 11,443,006 B2
(45) Date of Patent: Sep. 13, 2022

(54) INTELLIGENT BROWSER BOOKMARK MANAGEMENT

(71) Applicant: VMware, Inc., Palo Alto, CA (US)

(72) Inventors: Rohit Pradeep Shetty, Bangalore (IN); Erich Stuntebeck, Johns Creek, GA (US); Chaoting Xuan, Duluth, GA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/142,657

(22) Filed: Jan. 6, 2021

(65) Prior Publication Data
US 2022/0215065 A1 Jul. 7, 2022

(51) Int. Cl.
*G06F 16/955* (2019.01)
*G06N 5/02* (2006.01)
*G06F 16/951* (2019.01)
*G06N 20/00* (2019.01)
*G06F 17/00* (2019.01)

(52) U.S. Cl.
CPC ........ *G06F 16/9562* (2019.01); *G06F 16/951* (2019.01); *G06N 5/02* (2013.01); *G06N 20/00* (2019.01)

(58) Field of Classification Search
CPC ..... G06F 16/9562; G06F 16/951; G06N 5/02; G06N 20/00
See application file for complete search history.

(56) References Cited

U.S. PATENT DOCUMENTS

| | | | | |
|---|---|---|---|---|
| 2003/0144984 | A1* | 7/2003 | Dunbar | G06F 16/9562 |
| 2012/0216102 | A1* | 8/2012 | Malla | G06F 40/169 |
| | | | | 715/206 |
| 2014/0108901 | A1* | 4/2014 | Carriero | G06F 16/9562 |
| | | | | 715/206 |
| 2018/0300421 | A1* | 10/2018 | Andreica | G10L 15/26 |
| 2021/0240793 | A1* | 8/2021 | Andreica | G06F 40/169 |

* cited by examiner

*Primary Examiner* — Quoc A Tran
(74) *Attorney, Agent, or Firm* — Clayton, McKay & Bailey, PC

(57) ABSTRACT

Systems and methods are described for managing saved web pages on a user device. In an example, when a user bookmarks a web page at the user device, the user device can send the bookmark to a server. A service on the server can gather information about web page and associate a plurality of tags with the web page based on that information. The service can compare the web page's tags to tags of other previously bookmarked web pages to identify a possible matching web page. The service can perform a semantic similarity analysis between the two web pages to determine whether their similarity exceeds a threshold. Where the similarity does exceed the threshold, the service can notify the user device. The user device can notify the user and present options for the new bookmarked web page.

20 Claims, 5 Drawing Sheets

INTELLIGENT BROWSER BOOKMARK MANAGEMENT

BACKGROUND

Bookmarks are a widely used feature in web browsers. Most people utilize bookmarks in their daily lives without a second thought. They allow people to quickly access a web page without needing to remember its associated Uniform Resource Locator ("URL"). This saves a significant amount of time because users do not have to search to find the website again.

However, one problem with bookmarks today is that users often continually create bookmarks, and many of them are never revisited for months. Some users save hundreds of bookmarks to their browser, many of which contain duplicative information or even broken links. Those bookmarks then only serve to create more congestion in a user's bookmark library and make it more difficult to locate bookmarks that the user actually wants to use.

Web browsers are not equipped to handle these problems. For example, current web browsers can only look at the URL or page title of a web page to determine whether a bookmark is a duplicate. If the URL and page title are different, a user might end up bookmarking the same article on different websites.

Also, URLs can become inaccessible over time for various reasons, such as the host moving the website. Also, there could even be a new updated version of the content from a web page that is in a different, unbookmarked webpage. The user has no way of knowing that his bookmarked page is perhaps out of date.

Finally, users might want to have follow-up action with a bookmarked webpage. For example, a user may want to show a bookmarked page in a meeting two weeks later, keep track of changes on target content in a webpage and want to be notified in a timely manner, or know of a new chapter published in a book draft webpage. Currently there is no way for a user to do any of these things.

As a result, a need exists for intelligently managing saved web pages on a user device.

SUMMARY

Examples described herein include systems and methods for managing saved web pages on a user device. In an example, a server can receive a new bookmark of a web page saved through a browser of the user device. A service on the server can gather information about the web page and associate a plurality of tags with the web page based on that information. The service can compare the web page's tags to tags of other previously bookmarked web pages to identify a possible matching web page. The service can analyze the semantic similarity between the two web pages to determine whether their similarity exceeds a threshold. Where the similarity does exceed the threshold, the service can notify the user device. The user device can notify the user that the newly bookmarked web page may be a duplicate and present options to the user regarding whether to replace the previous bookmark or create a new one.

In an example, the semantic similarity analysis can include constructing a knowledge graph from the web pages. A knowledge graph can be a multi-component system that takes input of a web page and its schema and outputs a list of entities and their relations. In an example, the service can use methods like Named Entity Recognition ("NER"), Relation Extraction ("RE") and Semantic Web to extract semantic contents from a webpage and construct the knowledge graph from the extracted contents. In one example, the semantic similarity analysis can include using document embedding techniques whereby the extracted words are mapped to numerical vector spaces. In one example, the semantic similarity analysis can output a numerical score, which can be based on the numerical vector spaces. The numerical score can be a confidence score in that it represents the confidence level that the two web pages are a match. In an example, the confidence score can be compared to the threshold to determine whether to take any additional action.

In an example, when the confidence score exceeds the threshold, the service can automatically replace the previous bookmark. In one example, the browser can allow the user to choose whether to have old bookmarks automatically replaced by new ones when a duplicate is detected or to prompt the user for further action.

In an example, the service can periodically search for suggested web pages to replace older bookmarks that may have broken links or dated information. For example, the service can search the internet using the web page's associated tags or other information extracted from the web page. The service can perform a semantic similarity analysis on possible matches and notify the user of any web sites that exceed a threshold.

In an example, the browser can allow a user to set parameters for monitoring the bookmarked web page. The service can periodically analyze the web page according to the parameters and notify the user if a corresponding change occurs. In one example, the service can analyze the semantic similarity of the portions of the web page that correspond to the user's parameters to identify changes.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described for managing saved web pages on a user device. In an example, when a user bookmarks a web page at the user device, the user device can send the bookmark to a server. A service on the server can gather information about web page and associate a plurality of tags with the web page based on that information. The service can compare the web page's tags to tags of other previously bookmarked web pages to identify a possible matching web page. The service can perform a semantic similarity analysis between the two web pages to determine whether their similarity exceeds a threshold. Where the similarity does exceed the threshold, the service can notify the user device. The user device can notify the user and present options for the new bookmarked web page.

In an example, the service can periodically search for web pages that are semantically similar to web pages the user has bookmarked. Where a match is found, the user can be notified of the new web page that may contain updated information. In another example, the service can save tag associations for bookmarked pages. The service can periodically check the bookmarked URLs to determine whether the link has broken. If a link does break, the service can search the Internet using the tags to identify possible replacement web pages.

In one example, the user can select to monitor bookmarked web pages for changes. The service can periodically analyze the web page and compare it to tags or a knowledge graph of the web page when the bookmark was created to determine whether anything has changed on the page. In an example, the user can specific what kind of changes to a bookmarked web page that the user wants to be alerted to.

Figure 1:
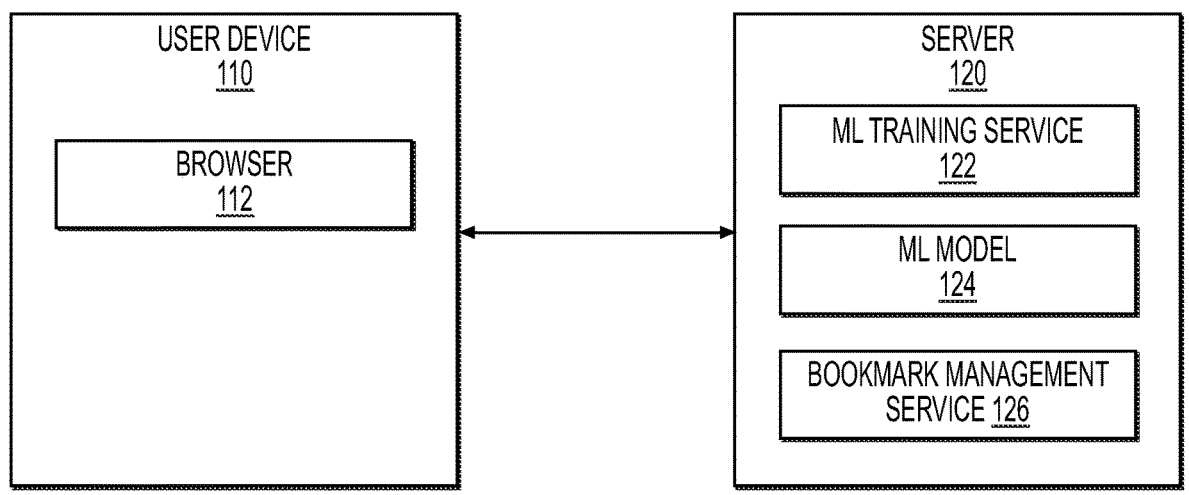
FIG. 1 is an illustration of a system for intelligently managing browser bookmarks.

FIG. 1 is an illustration of a system for managing saved web pages on a user device. In an example, the system can include a user device 110. The user device 110 can be one or more processor-based devices, such as a personal computer, tablet, or cell phone. The user device 110 can include a browser 112. The browser 112 can be an application that accesses content on the internet, or it can be a web portal within an application that performs additional functionality. In an example, the browser 112 can include a feature that allows a user to save Uniform Resource Locators ("URLs") for web pages, such as bookmarks. In another example, the browser 112 can include a feature that allows a user to log into an account on the browser 112. The browser 112 can sync the bookmarks with a server, like the server 120, and if the user logs into the account on the browser of another user device, the bookmarks can be loaded from the server.

The server 120 can be a single server or a group of servers, including multiple servers implemented virtually across multiple computing platforms. For example, the server 120 can be a cloud-based computing environment that provides an application service to user devices like the user device 110. The server 120 can include a machine learning ("ML") training service 122 that trains ML models 124. For example, the ML training service 122 can train ML models 124 to extract information from bookmarked web pages, such as the web page type, keywords, author, domain, and features.

The server 120 can also include a bookmark management service 126. The bookmark management service 126 can be software that manages bookmarks for users. For example, the bookmark management service 126 can sync new bookmarks saved to the browser 112 across all browsers on other devices that the user is logged into. For example, when a user saves a web page as a bookmark, the browser 112 can send the bookmark to server 120 as a data file using a Hypertext Transfer Protocol ("HTTP") or Application Programming Interface ("API") call. In an example, the bookmark management service 126 can include features that help users to manage their bookmark library. These features are described in detail throughout this application.

In some examples, the bookmark management service 126, or an agent of the bookmark management service 126, can be installed on the user device. For example, the bookmark management service 126 can be a standalone application, a background service, or a module installed on the browser 112. Accordingly, the actions described herein as being performed by the bookmark management service 126 can be performed on the server 120 or the user device 110.

Figure 2:
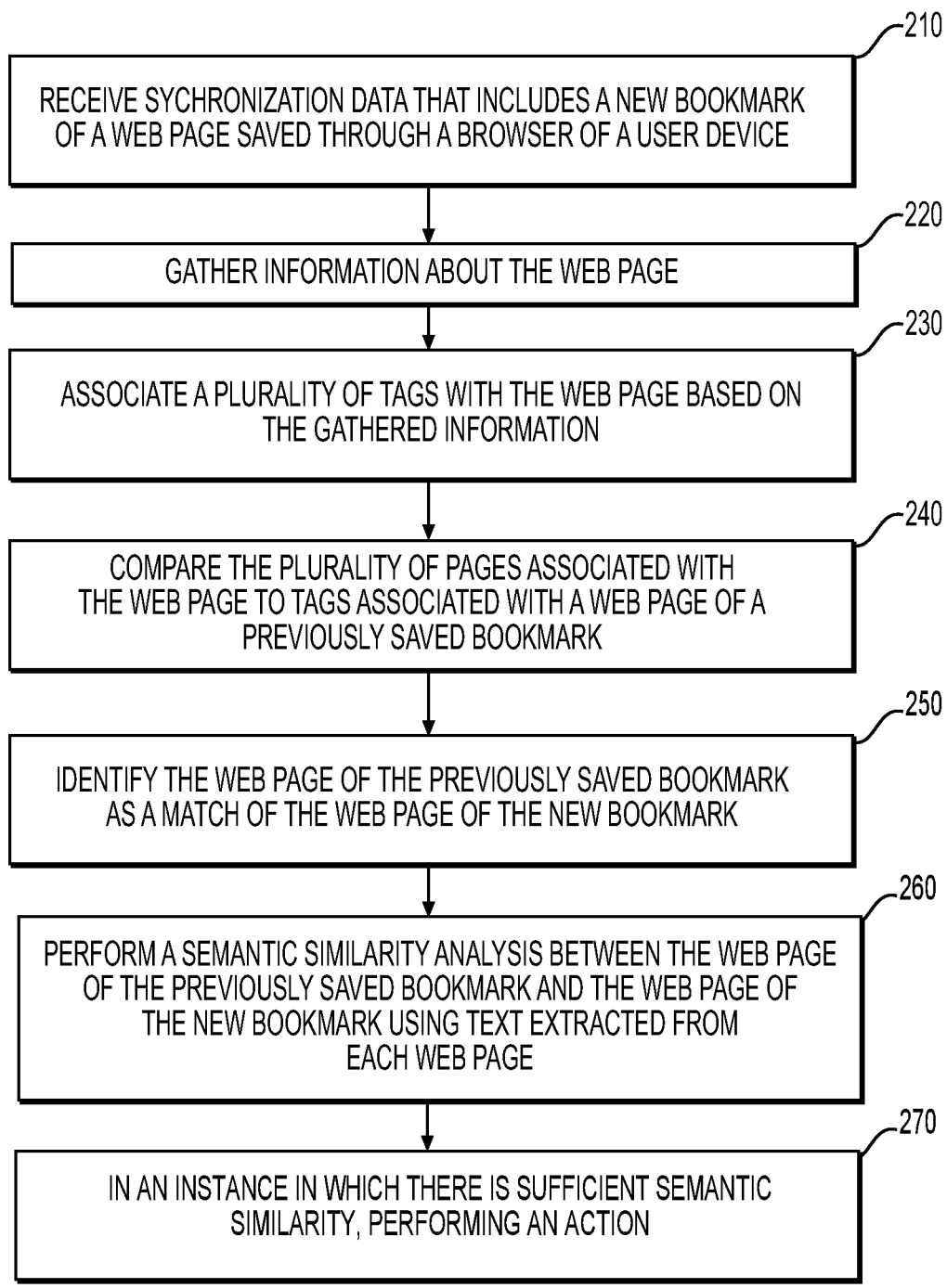
FIG. 2 is a flowchart of an example method for intelligently managing browser bookmarks.

FIG. 2 is a flowchart of an example method for managing saved web pages on a user device. At stage 210, the bookmark management service 126 can receive data of a new bookmark saved through the browser 112. For example, a user can navigate to a web page in the browser 112. The user can bookmark the web page, and the browser 112 can send data relating to the bookmark to the bookmark management service 126. As an example, the bookmark data can include the URL of the web page.

At stage 220, the bookmark management service 126 can gather information about the web page. In an example, this can include retrieving the web page. For example, when the bookmark management service 126 receives the URL of a new bookmarked page, the bookmark management service 126 can make an HTTP request using the URL. A web server corresponding to the URL can respond with a data file of the web page, such as a Hypertext Markup Language ("HTML") file. The bookmark management service 126 can store the received file at storage location of the server 120.

At stage 230, the bookmark management service 126 can associate tags with the web page based on the gathered web page information. A tag can be a keyword or term assigned to a piece of information. For example, the bookmark management service 126 can extract data from the web page such as its date, author, domain, keywords, images, and features. Tags can be associated with the extracted data to categorize the web page into various high-level categories. In an example, the bookmark management service 126 can implement one or multiple classification types to categorize the web page and associate tags. Some examples of classification types can include a subject classification, functional classification, and a sentiment classification. A subject classification relates to the subject or topic of the web page, such as whether the web page relates to "news," "sports," "business," or "commercial." A functional classification can identify a web page's role, such as a "dashboard," an "informational article," or a "video." A sentiment classification can identify an opinion or viewpoint on a page, such as the author's attitude toward a particular subject. These classification types are merely examples, and other classification types can be used. In some examples, the bookmark management service 126 can classify the web page using multiple classification types. In an example, the bookmark management service 126 can associate tags with the web page for any web page categories that apply.

In an example, the bookmark management service 126 can extract keywords from the web page. For example, the bookmark management service 126 can include, or have access to, a library of keywords. The bookmark management service 126 can search the web page for these keywords and associate a tag for each keyword it finds. In one example, the keywords identified in the web page can be used to implement the classification methods described above. In another example, the keywords can be mapped to an associated tag.

The bookmark management service 126 can associate tags for each keyword found in the web page. In one example, additional weight can be added for a keyword tag based on the number of times the keyword appears, or where it appears, in the web page. For example, additional weight can be given to keywords located in a heading or the title of the web page.

In an example, the bookmark management service 126 can associate the tags by applying the ML model 124 to the web page. For example, the ML model 124 can be trained to apply the web page classification methods and extract keywords from the web page. In one example, the ML model 124 can also analyze related pages to the web pages, such as a parent web page on the domain or web pages corresponding to links in the bookmarked page.

In one example, tags can be provided by an administrator ("admin"). For example, an admin user can have access to an admin console that includes an interface where the admin can configure bookmark management settings. The admin console can allow an admin user to add or remove tags used to categorize bookmarked web pages.

In an example, the bookmark management service 126 can store tags for each web page. For example, the bookmark management service 126 can save tags to a relational data table that stores information for each web page and its associated tags. This information can later be retrieved to compare bookmarked web pages, as described in further detail below.

At stage 240, the bookmark management service 126 can compare the tags associated with the web page to tags associated with a web page of a previously saved bookmark. For example, the bookmark management service 126 service can identify which previously bookmarked web pages share tags with the new bookmarked page. This can determine, for example, if the new bookmarked web page has the same title, keywords, author, domain, and other features of a previously bookmarked web page. In an example, the bookmark management service 126 can compare web page tags using the relational data table described above.

At stage 250, the bookmark management service 126 can identify the web page of the previously saved bookmark as a match of the web page of the new bookmark. A match can indicate that the new and previously bookmarked web pages, or their respective content, are the same or substantially similar to each other. In one example, previously saved bookmarks can be identified as a match if the number of matching tags exceeds a predetermined threshold.

In another example, the tags can be categorically weighted. For example, matching titles can be given greater weight than to matches between individual keywords. Each tag can include an associated multiplier that reflects its weight. In one example, tag weights can be assigned by an admin. In other example, the ML model 124 can be trained to adjust tag weights, such as when a user indicates that the new bookmarked web page is the same as the previous one. In an example, the bookmark management service 126 can multiply each matching tag by its corresponding weight value to calculate a match score. The match score can indicate the likelihood that the new and previously bookmarked web pages are a match. In an example, the bookmark management service 126 can identify a previously bookmarked web page as a match where the match score exceeds the threshold.

At stage 260, the bookmark management service 126 can perform a semantic similarity analysis between the web page of the previously saved bookmark and the web page of the new bookmark using text extracted from each web page. The semantic similarity analysis can be an in-depth analysis of matching web pages to determine how similar they are. For example, the match identification of stage 250 can be an initial screening to identify bookmarked pages that merit a more thorough comparison to be performed at stage 260.

A semantic similarity analysis can determine the semantic similarity between content on web pages. In an example, the bookmark management service 126 can apply the ML model 124 to execute an algorithm to compute semantic similarity analysis. In one example, the ML model 124 can implement document embedding techniques, whereby words in the web pages are mapped to numerical vector spaces. A word's vector space, or word vector, is a row of numbers where each number represents a dimension of the word's meaning. Each dimension can represent a different meaning or concept, and each number can indicate the word's closeness to that dimension. A word vector can therefore be a numerical, and thereby calculable, representation of a word. In one example, the ML model 124 can implement the semantic similarity analysis using the full content of the web pages. In an alternate example, the ML model 124 can use the associated tags for each page.

In an example, the semantic similarity analysis can include constructing a knowledge graph from the web pages. A knowledge graph can be a multi-component system that takes input of a web page (e.g., semi-structured data) and its schema (ontology definition) and outputs a list of entities and their relations (structured data) that can be stored in a database, such as a graph database or Resource Description Framework ("RDF") triple store. In an example, this can include extracting semantic contents from a webpage using methods like NER, RE and Semantic Web and constructing a knowledge graph from the extracted contents.

In an example, the output of the semantic similarity analysis can include one or more numerical values. For example, the ML model 124 can execute an algorithm that calculates a confidence score of the match. A confidence score can indicate the likelihood that the web pages are a match. In one example, the confidence score can be calculated as a percentage.

In an example, the ML model 124 can perform a semantic similarity analysis to categorize the similarity of the two web pages. For example, the ML model 124 can output whether the web pages are the same, similar, or different. In one example, the ML model 124 can calculate a similarity confidence score. For example, the ML model 124 can use the document embedding techniques described above to calculate a numerical score for the similarity of two web pages. In one example, the ML model 124 can compare the score to predetermined categorical ranges that represent different levels of similarity. In an example, the predetermined categorical ranges can be set by an administrator. In another example, the ML model 124 can calculate the similarity as a percentage.

At stage 270, in an instance in which there is sufficient semantic similarity, the bookmark management service 126 can perform an action. In an example, the bookmark management service 126 can inform the user that a similar web page is already bookmarked. For example, the bookmark management service 126 can instruct the browser 112 to display a notification informing the user of the similar page. In one example, the notification can include an option for the user to replace the existing bookmark with the new one or create a new bookmark. In another example, the notification can include the similarity score to assist the user in determining whether to replace the existing bookmark or create a new one. The notification can also include information from, or a link to, the web page of the existing bookmark.

In an example, the bookmark management service 126 can automatically replace the existing bookmark with the new bookmark without notifying the user. In one example, the browser 112 can include an option that allows a user to choose between receiving a notification of duplicate bookmarks or having them automatically replaced.

In an example of the method described above, a user can bookmark a web page using the browser 112. The browser 112 can send the bookmark to the bookmark management service 126, which can be on the user device 110 or the server 120. The bookmark management service 126 can access a web page using a URL included in the bookmark. The bookmark management service 126 can associate tags with various elements of the web page, and then bookmark management service 126 can compare the tags with tags associated with the other web pages previously bookmarked under the user's profile. Based on the comparison, the bookmark management service 126 can identify a bookmarked web page that exceeds a threshold matching score. The bookmark management service 126 can apply the ML model 124 to perform a sematic similarity analysis between the two pages. The semantic similarity analysis can result in a similarity score for the web pages. Where the similarity score exceeds a threshold, the bookmark management service 126 service can instruct the browser 112 to inform the user of the similar web page and prompt the user to choose whether to continue creating a new bookmark.

Figure 3:
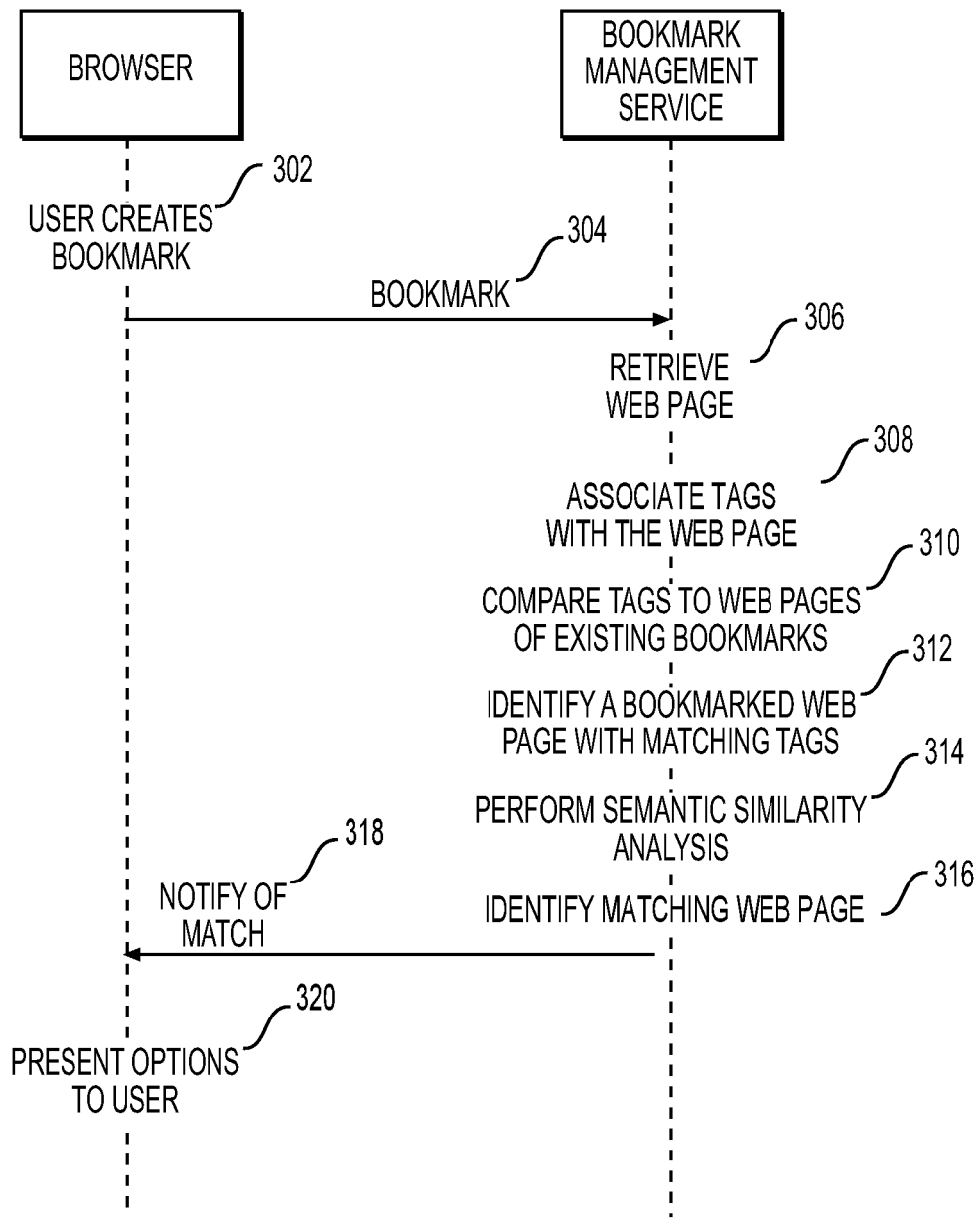
FIG. 3 is a sequence diagram of an example method for intelligently managing browser bookmarks.

FIG. 3 is a sequence diagram of an example method for managing saved web pages on a user device 110 that includes removing duplicate bookmarks. At stage 302, a user can create a bookmark at the browser 112. For example, the browser 112 can include a bookmark feature that allows a user to save web pages for easy access. The user can navigate to a web page and execute the bookmark feature to save the web page.

At stage 304, the browser 112 can send the bookmark to the bookmark management service 126. In one example, the browser 112 can send the bookmark as a data file, such as an HTML or extensible markup language ("XML") file, via the Internet using an HTTP call. In another example where the bookmark management service 126 is on the user device 110, the browser 112 can send the bookmark using an API call.

At stage 306, the bookmark management service 126 can retrieve information about the web page. This can include retrieving portions of the web page or the entire data file of the web page. In one example, the bookmark management service 126 can make an HTTP request with the URL of the web page. A web server that hosts the web page can receive the request and send an HTML data file of the web page. In another example, the browser 112 can send the HTML data file, or portions therefore, to the bookmark management service 126 along with the bookmark at stage 304. In an example where the bookmark management service 126 is on the user device 110, the browser 112 can save the web page in a cache of the user device 110, such as a browser cache or a memory component of the user device 110. When the bookmark management service 126 receives the bookmark from the browser 112, the bookmark management service 126 can retrieve the web page data from the cache.

At stage 308, the bookmark management service 126 can associate tags with the web page. For example, the bookmark management service 126 can extract data from the web page, such as its author, domain, keywords, and features, and associate pieces of the extracted data with categorical tags.

In an example, the bookmark management service 126 can implement one or multiple classification types to categorize the web page and associate tags, such as a subject classification, functional classification, and sentiment classification. In one example, tags can be provided by an admin. For example, an admin user can have access to an admin console that includes an interface where the admin can configure bookmark management settings. The admin console can allow an admin user to add or remove tags used to categorize bookmarked web pages.

In an example, the bookmark management service 126 can associate the tags by applying the ML model 124 to the web page. For example, the ML model 124 can be trained to apply the web page classification methods and extract keywords from the web page. In one example, the ML model 124 can also analyze related pages to the web pages, such as a parent web page on the domain or web pages corresponding to links in the bookmarked page.

At stage 310, the bookmark management service 126 can compare the tags to web pages of existing bookmarks. For example, the bookmark management service 126 can identify which previously bookmarked web pages share tags with the new bookmarked page. This can determine, for example, if the new bookmarked web page has the same title, keywords, author, domain, and other features of a previously bookmarked web page.

At stage 312, the bookmark management service 126 can identify a bookmarked web page with matching tags. A match can indicate that the new and previously bookmarked web pages, or their respective content, are the same or substantially similar to each other. In one example, previously saved bookmarks can be identified as a match if the number of matching tags exceeds a predetermined threshold. In an example, the threshold can be set by an administrator.

In another example, the tags can be categorically weighted. For example, matching titles can be given greater weight to individual keywords that match up. Each tag can include an associated multiplier that reflects its weight. The bookmark management service 126 can multiply each matching tag by its corresponding weight value to calculate a match score. The match score can indicate the likelihood that the new and previously bookmarked web pages are a match. In an example, the bookmark management service 126 can identify a previously bookmarked web page as a match where the match score exceeds the threshold.

At stage 314, the bookmark management service 126 can perform a semantic similarity analysis on the two web pages. In one example, the semantic similarity analysis can be performed by applying the ML model 124. In one example, the semantic similarity analysis can include document embedding techniques whereby words in the web pages are mapped to numerical vector spaces. In one example, the ML model 124 can map the associated tags of each page to numerical vector spaces.

In an example, the semantic similarity analysis can include constructing a knowledge graph from the web pages. In an example, the service can use methods like NER, RE and Semantic Web to extract semantic contents from a webpage and construct the knowledge graph from the extracted contents.

In an example, the output of the semantic similarity analysis can include one or more numerical values. For example, the ML model 124 can execute an algorithm that calculates a confidence score of the match. A confidence score can indicate the likelihood that the web pages are a match. In one example, the confidence score can be calculated as a percentage.

At stage 316, the bookmark management service 126 can identify a matching web page. In an example, a web page can be identified as a match based on the confidence score exceeding a threshold. In one example, the threshold can be set by an admin. In another example, the ML training service 122 can receive feedback from the browser 112 indicating when a user accepts or denies a bookmark URL replacement and what the confidence score was for each potential replacement web page. The ML training service 122 can modify the threshold number based on that feedback. In one example where multiple web pages exceed the threshold confidence score, the bookmark management service 126 can select the web page with the highest confidence score to present to the user. In another example, the bookmark management service 126 can present all web pages that exceed the threshold confidence score. At stage 318, the bookmark management service 126 can notify the browser 112 of the match.

At stage 320, the browser 112 can present options to the user. In an example, the bookmark management service 126 can inform the user that a similar web page is already bookmarked. For example, the bookmark management service 126 can instruct the browser 112 to display a notification informing the user of the similar page. In one example, the notification can include an option for the user to replace the existing bookmark with the new one or create a new bookmark. In another example, the notification can include the similarity score to assist the user in determining whether to replace the existing bookmark or create a new one. The notification can also include information from, or a link to, the web page of the existing bookmark.

Figure 4:
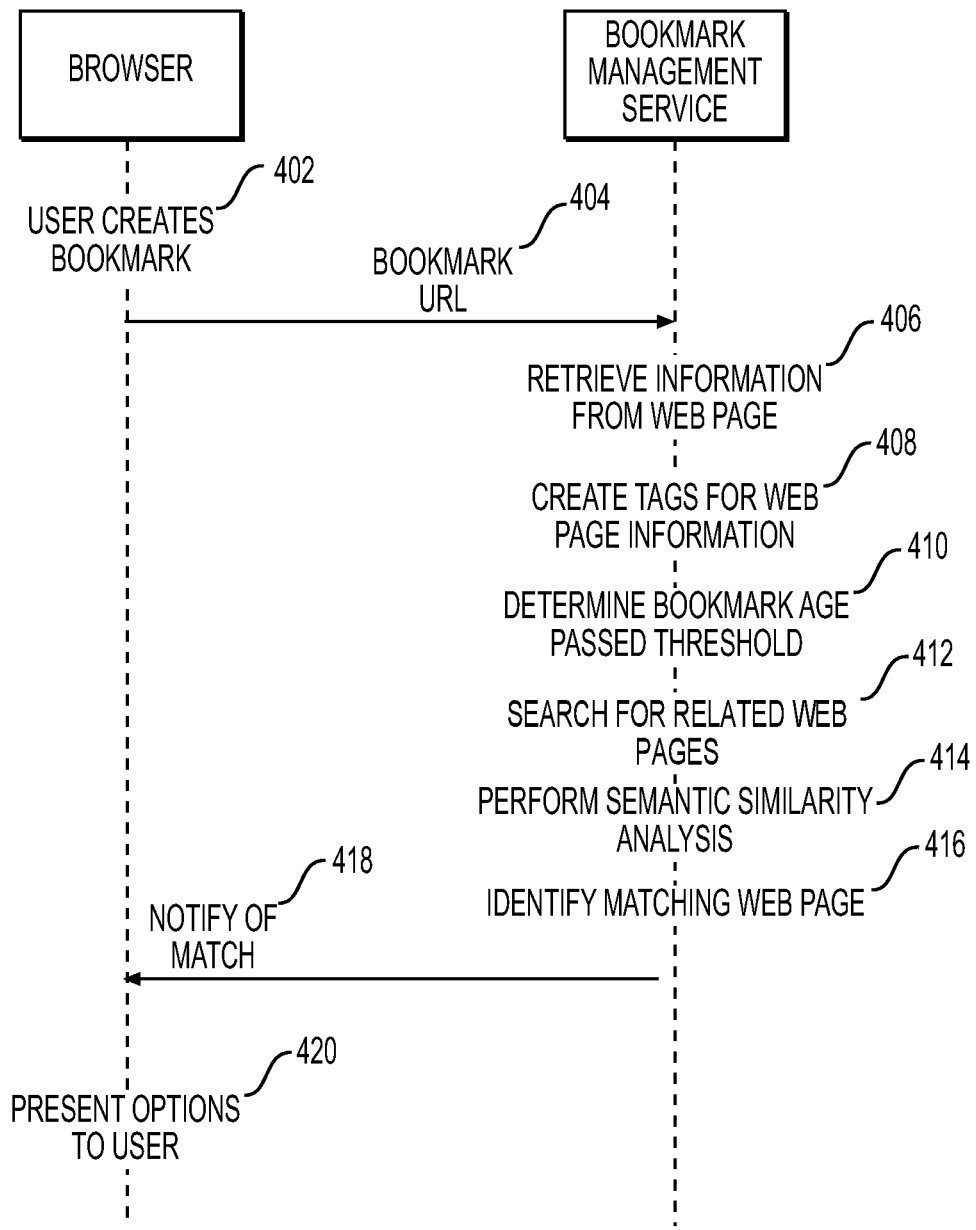
FIG. 4 is another sequence diagram of an example method for intelligently managing browser bookmarks.

In some examples, the bookmark management service 126 can perform an action in response to the user selecting an option. In one example, the bookmark management service 126 can replace the existing bookmark with the new bookmark. In another example, the bookmark management service 126 can keep the existing bookmark and create a new bookmark. In one such example, the bookmark management service 126 can cause the ML training service 122 to identify differences between the two bookmarked web pages and retrain the ML model 124 using the differences. In one example, the user can be presented with an option to perform an action automatically for future bookmark matches. For example, the user can select to also replace an existing bookmark when a matching page is found. For future identified matches, the bookmark management service 126 can automatically replace the existing bookmark without prompting the user to select an option. In one example, the bookmark management service 126 can cause the browser 112 to notify the user when an existing bookmark is replaced with a matching web page. FIG. 4 is another sequence diagram of an example method for managing saved web pages on a user device that includes identifying broken or outdated bookmarks. At stage 402, a user can create a bookmark at the browser 112. For example, the browser 112 can include a bookmark feature that allows a user to save web pages for easy access. The user can navigate to a web page and execute the bookmark feature to save the web page.

At stage 404, the browser 112 can send the bookmark to the bookmark management service 126. In one example, the browser 112 can send the bookmark as a data file, such as an HTML or XML file, via the Internet using an HTTP call. In another example where the bookmark management service 126 is on the user device 110, the browser 112 can send the bookmark using an API call.

At stage 406, the bookmark management service 126 can retrieve information about the web page. This can include retrieving portions of the web page or the entire data file of the web page. In one example, the bookmark management service 126 can make an HTTP request with the URL of the web page. A web server that hosts the web page can receive the request and send an HTML data file of the web page. In another example, the browser 112 can send the HTML data file, or portions therefore, to the bookmark management service 126 along with the bookmark at stage 404. In an example where the bookmark management service 126 is on the user device 110, the browser 112 can save web page in a cache of the user device 110, such as a browser cache or a memory component of the user device 110. When the bookmark management service 126 receives the bookmark from the browser 112, the bookmark management service 126 can retrieve the web page data from the cache.

At stage 408, the bookmark management service 126 can associate tags with the web page. For example, the bookmark management service 126 can extract data from the web page, such as its author, domain, keywords, and features, and associate pieces of the extracted data with categorical tags. In an example, the bookmark management service 126 can implement one or multiple classification types to categorize the web page and associate tags, such as a subject classification, functional classification, and a sentiment classification. In one example, tags can be provided by an admin. For example, an admin user can have access to an admin console that includes an interface where the admin can configure bookmark management settings. The admin console can allow an admin user to add or remove tags used to categorize bookmarked web pages.

In an example, the bookmark management service 126 can associate the tags by applying the ML model 124 to the web page. For example, the ML model 124 can be trained to apply the web page classification methods and extract keywords from the web page. In one example, the ML model 124 can also analyze related pages to the web pages, such as a parent web page on the domain or web pages corresponding to links in the bookmarked page.

At stage 410, the bookmark management service 126 can determine that the bookmark has passed a threshold age. In one example, the bookmark management service 126 can be configured to periodically reanalyze a user's bookmarks to determine whether the bookmarked web pages are current or have a broken URL. For example, the bookmark management service 126 can reanalyze bookmarks every six months or year. In another example, the bookmark management service 126 can reanalyze a bookmark once it reaches a certain age, such as six months or a year after it is created, and then continue to reanalyze that bookmark periodically thereafter. The time between each analysis can be set by an admin, in an example.

At stage 412, the bookmark management service 126 can perform a search for web pages similar to the bookmarked web page. In one example, the bookmark management service 126 can perform a web crawl using the web page's associated tags. In another example, the web crawl can be performed using data directly from the web page, such as keywords and categories. In one example, the bookmark management service 126 can also search bookmarks of other users. For example, employees in an enterprise environment may be likely to search for and bookmark web pages with semantically similar information. The bookmark management service 126 can search the bookmarked web pages of other employees in the enterprise to determine whether other employees have bookmarked a semantically similar web page that is more up to date than the user's bookmarked web page.

At stage 414, the bookmark management service 126 can perform a semantic similarity analysis on the bookmarked web page and the web pages identified in the web crawl. In one example, because a web crawl can return thousands of results, the bookmark management service 126 can be configured to limit the number of web pages in the results that are included in the semantic similarity analysis. For example, the bookmark management service 126 can perform the analysis on the top 20 or 30 results. In an example, the bookmark management service 126 can implement the ML model 124 to execute the analysis. In one example, the semantic similarity analysis can include document embedding techniques whereby words in the web pages are mapped to numerical vector spaces. The ML model 124 can compare the word vectors of each page to the bookmarked web page.

In an example, the semantic similarity analysis can include constructing a knowledge graph from the web pages. In an example, this can include extracting semantic contents from a webpage using methods like NER, RE and Semantic Web and constructing a knowledge graph from the extracted contents.

In an example, the output of the semantic similarity analysis can include one or more numerical values. For example, the ML model 124 can execute an algorithm that calculates a confidence score of the match. A confidence score can indicate the likelihood that the web pages are a match. In one example, the confidence score can be calculated as a percentage.

At stage 416, the bookmark management service 126 can identify a matching web page. In an example, a web page can be identified as a match based on the confidence score exceeding a threshold. In one example, the threshold can be set by an admin. In another example, the ML training service 122 can receive feedback from the browser 112 indicating when a user accepts or denies a bookmark URL replacement and what the confidence score was for each potential replacement web page. The ML training service 122 can modify the threshold number based on that feedback. In one example where multiple web pages exceed the threshold confidence score, the bookmark management service 126 can select the web page with the highest confidence score to present to the user. In another example, the bookmark management service 126 can present all web pages that exceed the threshold confidence score. At stage 418, the bookmark management service 126 can notify the browser 112 of the match.

At stage 420, the browser 112 can present options to the user. In an example, the browser 112 can inform the user that it located a newer web page with semantically similar content that may be more up to date. The user can have the option to view the new page and determine whether to replace the bookmark with the URL to the new page. In one example, the browser 112 can include an option that allows the user to choose to have bookmarked web pages automatically updated when a new page is found. In another example, the notification can include the similarity score to assist the user in determining whether to replace the existing bookmark.

In some examples, the bookmark management service 126 can perform an action in response to the user selecting an option. In one example, based on the user selection, the bookmark management service 126 can replace the existing bookmark with the new web page. In an example where the user elects not to replace the bookmarked web page, the bookmark management service 126 can cause the ML training service 122 to identify differences between the bookmarked web page and the new web page and retrain the ML model 124 using the differences. In one example, the user can be presented with an option to perform an action automatically whenever a possible replacement web page is identified. For example, the user can select to replace an existing bookmark when a new page is found. For future identified matches, the bookmark management service 126 can automatically replace the existing bookmark without prompting the user to select an option. In one example, the bookmark management service 126 can cause the browser 112 to notify the user when an existing bookmark is replaced with a new web page.

In one example of the above described method, determining that the bookmark has passed a threshold age at stage 410 can include verifying that the URL in the bookmark is not broken. For example, the bookmark management service 126 can make an HTTP request using the URL to make sure the web page is still active. In one example, the bookmark management service 126 can compare the web page received from the request with data relating to the bookmarked web page. For example, bookmark management service 126 can associate tags with the requested page and compare the tags to tags associated with the bookmarked web page to ensure that they match. This can help ensure that the content on the web page has not changed. In an example where the URL is broken or the web page content has changed, the bookmark management service 126 can proceed to stage 412 to attempt to identify a web page with substantially similar content that can replace the bookmarked URL.

Figure 5:
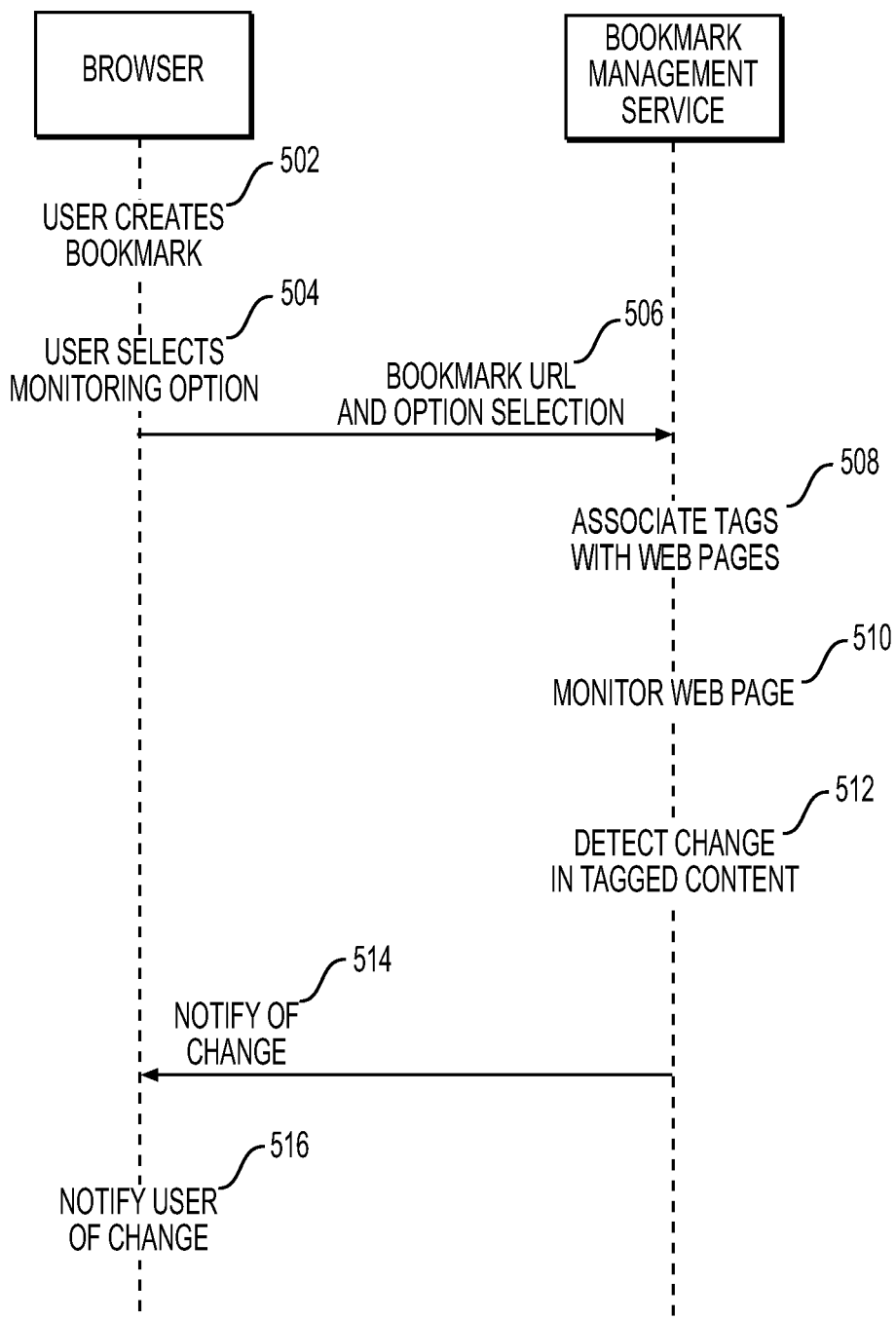
FIG. 5 is another sequence diagram of an example method for intelligently managing browser bookmarks.

FIG. 5 is another sequence diagram of an example method for managing saved web pages on a user device that includes detecting changes in bookmarked web pages. At stage 502, a user can create a bookmark at the browser 112. For example, the browser 112 can include a bookmark feature that allows a user to save web pages for easy access. The user can navigate to a web page and execute the bookmark feature to save the web page.

At stage 504, the user can select a monitoring option in the browser 112. For example, when a user creates a bookmark, the bookmark feature can include an option to monitoring the bookmarked web page. In one example, the browser 112 can allow the user to choose whether to monitor all bookmarks.

At stage 506, the browser 112 can send the bookmark URL and the monitoring option selection to the bookmark management service 126. In one example, the browser 112 can send the bookmark and selected option as a data file, such as an HTML or XML file, via the Internet using an HTTP call. In another example where the bookmark management service 126 is on the user device 110, the browser 112 can send the bookmark and selected option using an API call.

At stage 508, the bookmark management service 126 can associate tags with the web page. For example, the bookmark management service 126 can retrieve the web page by making an HTTP request with the web page's URL. A web server that hosts the web page can receive the request and send an HTML data file of the web page. The bookmark management service 126 can then extract data from the web page, such as its author, domain, keywords, and features. This data can then be associated with categorical tags. In one example, the bookmark management service 126 can create tags based on the web page data.

In one example, associating tags can include constructing a knowledge graph of the web page. For example, the bookmark management service 126 can extract semantic contents from a webpage using methods like NER, RE and Semantic Web, and construct a knowledge graph from the extracted contents.

In one example, the browser 112 can provide an option where the user can specify event-based triggers for monitoring. The event-based triggers can be linked to elements in the knowledge graph. The user can be alerted when a knowledge graph element changes that corresponds to an event-based trigger. This can allow a user to customize what kind of events on a bookmarked page that he wants to be alerted to. In one example, the user can bookmark a shared online folder and select to be notified if a file is added to the folder. The user can also specify the file type, name, subject, and category of files he wants to be alerted about. In another example, the user can bookmark an event registration web page. The user can provide the names or other identifiers of people for whom he would like to be notified if any of them register for the event. A user can also select to be notified if any date or location information for the event change on the bookmarked page.

At stage 510, the bookmark management service 126 can monitor the web page for changes. For example, the bookmark management service 126 can periodically perform a semantic similarity analysis on the bookmarked web page. The type and extent of the analysis can depend on the monitoring option selected by the user. For example, if the user wants to know if a particular coworker adds or modifies a document in a shared folder, the bookmark management service 126 can periodically construct a new knowledge graph of the web page and check for any elements in the knowledge graph pertaining to that user adding or modified a document. The bookmark management service 126 can do a similar analysis in checking for certain users on an event registration page or monitoring certain content on the event page for changes. In one example, the browser 112 can allow the user to configure how frequently the bookmark management service 126 checks the web page for changes. In another example, the bookmark management service 126 can monitor the web page by applying the ML model 124.

At stage 512, the bookmark management service 126 can detect a change in tagged content of the web page. In one example, the bookmark management service 126 can construct a new knowledge graph of the web page and compare it to the knowledge graph created when the user bookmarked the web page. The bookmark management service 126 can determine that at least one component in the new knowledge graph is different. In one example, the bookmark management service 126 can compare specific components of the knowledge graph. For example, where the user wants to know if the title of a bookmarked web page changes, the bookmark management service 126 can compare just the title component of the two knowledge graphs. In examples where the user wants to know of any particular new information on the web page, such as a new document uploaded to a shared folder or a new registrant for an event, the bookmark management service 126 can create a new knowledge graph of the web page and determine whether any new entities match criteria for the desired information.

At stage 514, the bookmark management service 126 can notify the browser 112 of the change. In one example, instead of notifying the browser 112, the bookmark management service 126 can notify a server, such as a push server. At stage 516, the browser 112, or push server, can notify the user of the change. The bookmark management service 126 can use other methods to notify the user as well, such as by sending an email or a text message.

In an example, information provided in the notification can depend on the monitoring event. As one example, where a user wants to know if the content on a web page changes, the notification can indicate which bookmarked web page the notification is for, such as with the web page's title and/or URL, and indicate the change that occurred. For example, the notification can display text that reads "A change to content on the web page [title] has been detected." In one example, the notification can include details about the changed content. In one example where the user wants to know about another user performing an action on the bookmarked page, such adding, removing, or modifying a document, the notification can provide the user's name or username and the event that occurred. An example template of such a notification can read "[user] [added/removed/modified] [document name] to/from/in the bookmarked web page [folder/web page]". For example, the notification can read "John Doe modified 'example.doc' in the Example folder of the bookmarked web page Shared Folder."

In an example, the notification can include a link to the web page. In one example, if the user selects the link, the bookmark management service 126 can highlight the content in the web page that changed to help the user identify the change. Alternatively, browser 112 can retrieve the web page and the bookmark management service 126 can provide instructions to browser 112 for highlighting the changed content. As an example, the bookmark management service 126 can identify the changed content in the HTML file of the web page. The bookmark management service 126 can insert a Cascading Style Sheets ("CSS") element into the HTML file that adds highlight styling to the changed content. The browser 112 can display the web page to the user with the added CSS element so that the user can easily identify the changed portions.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for managing saved web pages on a user device, comprising:
receiving, at a server remote from the user device, synchronization data that includes a bookmark of a web page saved through a browser of the user device;
gathering information about the bookmarked web page;
associating a plurality of tags with the web page based on the gathered information;
determining that the bookmark has exceeded a threshold age;
searching for a different web page using the plurality of tags associated with the bookmarked web page;
identifying the different web page based on the search;

performing a semantic similarity analysis between the different web page and the bookmarked web page using text extracted from each web page; and in an instance in which there is sufficient semantic similarity, performing an action.

2. The method of claim 1, wherein performing the action comprises identifying to the user that the bookmarked web page is outdated relative to the different web page.

3. The method of claim 2, wherein identifying to the user that the bookmarked web page is outdated comprises indicating a confidence score associated with the different web page.

4. The method of claim 1, wherein performing the action comprises automatically updating the bookmark such that it directs to the different web page.

5. The method of claim 1, wherein the plurality of tags relate to at least one of: type of web page, keywords, author, and domain.

6. The method of claim 1, wherein searching for the different web page comprises retrieving bookmark information from a different user employed by the same enterprise as a user of the user device.

7. The method of claim 1, wherein the semantic similarity analysis is performed using a knowledge graph constructed for each of the web pages.

8. A non-transitory, computer-readable medium containing instructions that, when executed by a hardware-based processor, performs stages for managing saved web pages on a user device, the stages comprising:

receiving, at a server remote from the user device, synchronization data that includes a bookmark of a web page saved through a browser of the user device;

gathering information about the bookmarked web page;

associating a plurality of tags with the web page based on the gathered information;

determining that the bookmark has exceeded a threshold age;

searching for a different web page using the plurality of tags associated with the bookmarked web page;

identifying the different web page based on the search;

performing a semantic similarity analysis between the different web page and the bookmarked web page using text extracted from each web page; and in an instance in which there is sufficient semantic similarity, performing an action.

9. The non-transitory, computer-readable medium of claim 8, wherein performing the action comprises identifying to the user that the bookmarked web page is outdated relative to the different web page.

10. The non-transitory, computer-readable medium of claim 9, wherein identifying to the user that the bookmarked web page is outdated comprises indicating a confidence score associated with the different web page.

11. The non-transitory, computer-readable medium of claim 8, wherein performing the action comprises automatically updating the bookmark such that it directs to the different web page.

12. The non-transitory, computer-readable medium of claim 8, wherein the plurality of tags relate to at least one of: type of web page, keywords, author, and domain.

13. The non-transitory, computer-readable medium of claim 8, wherein searching for the different web page comprises retrieving bookmark information from a different user employed by the same enterprise as a user of the user device.

14. The non-transitory, computer-readable medium of claim 8, wherein the semantic similarity analysis is performed using a knowledge graph constructed for each of the web pages.

15. A system for managing saved web pages on a user device, comprising:

a memory storage including a non-transitory, computer-readable medium comprising instructions; and a computing device including a hardware-based processor that executes the instructions to carry out stages comprising:

receiving, at a server remote from the user device, synchronization data that includes a bookmark of a web page saved through a browser of the user device;

gathering information about the bookmarked web page;

associating a plurality of tags with the web page based on the gathered information;

determining that the bookmark has exceeded a threshold age;

searching for a different web page using the plurality of tags associated with the bookmarked web page;

identifying the different web page based on the search;

performing a semantic similarity analysis between the different web page and the bookmarked web page using text extracted from each web page; and in an instance in which there is sufficient semantic similarity, performing an action.

16. The system of claim 15, wherein performing the action comprises identifying to the user that the bookmarked web page is outdated relative to the different web page.

17. The system of claim 16, wherein identifying to the user that the bookmarked web page is outdated comprises indicating a confidence score associated with the different web page.

18. The system of claim 15, wherein performing the action comprises automatically updating the bookmark such that it directs to the different web page.

19. The system of claim 15, wherein the plurality of tags relate to at least one of: type of web page, keywords, author, and domain.

20. The system of claim 15, wherein searching for the different web page comprises retrieving bookmark information from a different user employed by the same enterprise as a user of the user device.

* * * * *